(12) United States Patent
Lee et al.

(10) Patent No.: US 8,396,087 B2
(45) Date of Patent: Mar. 12, 2013

(54) DIGITAL BROADCASTING SYSTEM AND METHOD OF PROCESSING DATA

(75) Inventors: Hyoung Gon Lee, Seoul (KR); In Hwan Choi, Seoul (KR); Kook Yeon Kwak, Seoul (KR); Jong Moon Kim, Seoul (KR); Won Gyu Song, Seoul (KR); Byoung Gill Kim, Seoul (KR); Jin Woo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 305 days.

(21) Appl. No.: 12/969,376

(22) Filed: Dec. 15, 2010

(65) Prior Publication Data

US 2011/0085603 A1 Apr. 14, 2011

Related U.S. Application Data

(63) Continuation of application No. 12/016,534, filed on Jan. 18, 2008, now Pat. No. 7,889,766.

(60) Provisional application No. 60/885,717, filed on Jan. 19, 2007.

(30) Foreign Application Priority Data

Apr. 13, 2007 (KR) .................... 10-2007-0036430

(51) Int. Cl.
*H04J 3/04* (2006.01)
*H04B 1/66* (2006.01)
*H04H 20/71* (2008.01)
(52) U.S. Cl. ......... 370/532; 370/537; 370/312; 375/240
(58) Field of Classification Search ..... 375/240–240.24, 375/260, 312, 321, 340–341, 350, 261–265; 370/532–535, 537–541, 485–487, 204–207
See application file for complete search history.

(56) References Cited

U.S. PATENT DOCUMENTS

| | | | | |
|---|---|---|---|---|
| 6,980,603 | B2 * | 12/2005 | Choi et al. | 375/295 |
| 7,450,613 | B2 * | 11/2008 | Choi et al. | 370/486 |
| 7,813,445 | B2 * | 10/2010 | Kim et al. | 375/295 |
| 2002/0172154 | A1 | 11/2002 | Uchida et al. | |
| 2005/0052991 | A1 * | 3/2005 | Kadous | 370/216 |
| 2005/0157806 | A1 | 7/2005 | Walton et al. | |
| 2005/0175115 | A1 | 8/2005 | Walton et al. | |
| 2005/0180312 | A1 | 8/2005 | Walton et al. | |
| 2007/0140257 | A1 * | 6/2007 | Lee et al. | 370/395.6 |
| 2007/0211814 | A1 * | 9/2007 | Walton et al. | 375/267 |
| 2007/0297544 | A1 * | 12/2007 | Choi et al. | 375/346 |
| 2008/0031372 | A1 * | 2/2008 | Walton et al. | 375/260 |
| 2008/0031374 | A1 * | 2/2008 | Walton et al. | 375/267 |
| 2008/0095282 | A1 * | 4/2008 | Walton et al. | 375/347 |

(Continued)

FOREIGN PATENT DOCUMENTS

| | | |
|---|---|---|
| JP | 2000-224136 | 8/2000 |
| KR | 10-2006-0009737 | 2/2006 |
| WO | 02-01849 | 1/2002 |

*Primary Examiner* — Thai Hoang
(74) *Attorney, Agent, or Firm* — Lee, Hong, Degerman, Kang & Waimey

(57) ABSTRACT

A digital broadcasting system and method of processing data are disclosed. Herein, a method of processing data of a transmitting system includes generating a service informative null packet including service-related information of mobile service data, and multiplexing a plurality of main service data packets, a plurality of mobile service data packets, and a plurality of service informative null packets, and transmitting the multiplexed data packets to at least one transmitter located in a remote site. The digital broadcasting system and method of processing data may enhance receiving performance of a receiving system by performing additional encoding on mobile service data and by transmitting the processed data to the receiving system.

8 Claims, 9 Drawing Sheets

U.S. PATENT DOCUMENTS

| | | |
|---|---|---|
| 2008/0260036 A1 | 10/2008 | Park et al. |
| 2008/0267307 A1* | 10/2008 | Chang et al. .................. 375/265 |
| 2009/0046796 A1* | 2/2009 | Park et al. ..................... 375/265 |
| 2009/0052520 A1 | 2/2009 | Park et al. |
| 2009/0052589 A1 | 2/2009 | Park et al. |
| 2009/0110083 A1* | 4/2009 | Park et al. ................ 375/240.27 |
| 2009/0135936 A1* | 5/2009 | Chang et al. .................. 375/265 |
| 2009/0147889 A1* | 6/2009 | Chang et al. .................. 375/341 |

* cited by examiner

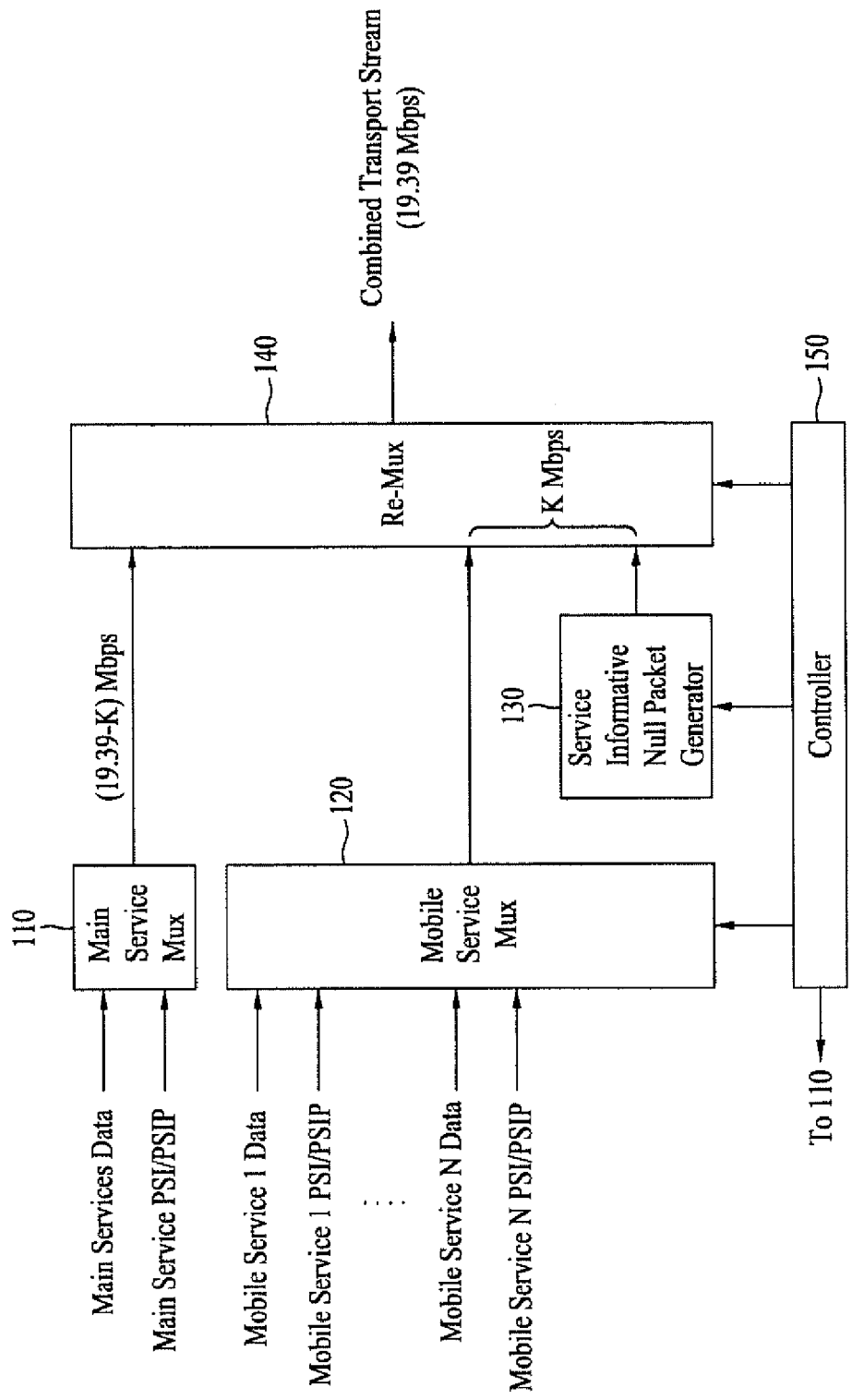

FIG. 3

| Syntax | No. of bits | Mnemonic |
|---|---|---|
| service_informative_null_packet( ) { | | |
|     sync_byte | 8 | bslbf |
|     transport_error_indicator | 1 | bslbf |
|     payload_unit_start_indicator | 1 | bslbf |
|     transport_priority | 1 | bslbf |
|     PID | 13 | uimsbf |
|     transport_scrambling_control | 2 | bslbf |
|     adaptation_field_control | 2 | bslbf |
|     continuity_counter | 4 | bslbf |
|     service_info_indicator | 1 | bslbf |
|     reserved | 7 | bslbf |
|     if (service_info_indicator == '1') { | | |
|     service_information( ) | | |
|     } | | |
|     for (i=0;i<N;i++) { | | |
|     stuffing_byte | 8 | bslbf |
|     } | | |
| } | | |

FIG. 4

| Syntax | No. of bits | Mnemonic |
|---|---|---|
| Service_information( ) { | | |
|     service_information_length | 8 | uimsbf |
|     service_id | 8 | bslbf |
|     number_of_services | 8 | uimsbf |
|     group_region_distinction_flag | 1 | bslbf |
|     group_region_id | 1 | bslbf |
|     reserved | 2 | bslbf |
|     super_frame_size | 4 | uimsbf |
|     burst_size | 6 | uimsbf |
|     reserved | 3 | bslbf |
|     turbo_code_mode | 3 | bslbf |
|     rs_code_mode | 4 | bslbf |
| } | | |

FIG. 7

| Turbo Code Mode | Outer code rate of Turbo Code | | |
|---|---|---|---|
| | Region A | Region B | Region C |
| "000" | 1/2 | 1/2 | 1/2 |
| "001" | 1/2 | 1/2 | 1/4 |
| "010" | 1/2 | 1/4 | 1/2 |
| "011" | 1/2 | 1/4 | 1/4 |
| "100" | 1/4 | 1/4 | 1/2 |
| "101" | 1/4 | 1/4 | 1/4 |
| "110" "111" | reserved | reserved | reserved |

FIG. 8A

| RS Code Mode for Region A/B | "00" | "01" | "10" | "11" |
|---|---|---|---|---|
| RS Code | (199,187) | (211,187) | (223,187) | (235,187) |
| # of parity (P) | 12 | 24 | 36 | 48 |

FIG. 8B

| RS Code Mode for Region C | "00" | "01" | "10" | "11" |
|---|---|---|---|---|
| RS Code | (199,187) | (211,187) | (223,187) | (235,187) |
| # of parity (P) | 12 | 24 | 36 | 48 |

DIGITAL BROADCASTING SYSTEM AND METHOD OF PROCESSING DATA

This application is a continuation of U.S. application Ser. No. 12/016,534, filed on Jan. 18, 2008, now U.S. Pat. No. 7,889,766 which claims the benefit of earlier filing date and right of priority to Korean Patent Application No. 10-2007-0036430, filed on Apr. 13, 2007, and also claims the benefit of U.S. Provisional Application Ser. No. 60/885,717, filed on Jan. 19, 2007, the contents of which are all hereby incorporated by reference herein in their entirety.

BACKGROUND OF THE INVENTION

1. Field of the Invention

The present invention relates to a digital broadcasting system, and more particularly, to a digital broadcasting system and a method of processing broadcast data.

2. Discussion of the Related Art

The Vestigial Sideband (VSB) transmission mode, which is adopted as the standard for digital broadcasting in North America and the Republic of Korea, is a system developed for the transmission of MPEG audio/video data. However, since the VSE transmission mode is a single carrier method, the receiving performance of the digital broadcast receiving system may be deteriorated in a poor channel environment. Particularly, since resistance to changes in channels and noise is more highly required when using portable and/or mobile broadcast receivers, the receiving performance may be even more deteriorated when transmitting mobile service data by the VSB transmission mode.

SUMMARY OF THE INVENTION

Accordingly, the present invention is directed to a digital broadcasting system and a method of processing data that substantially obviate one or more problems due to limitations and disadvantages of the related art.

An object of the present invention is to provide a digital broadcasting system and a method of processing data that are highly resistant to channel changes and noise.

Another object of the present invention is to provide a digital broadcasting system and a method of processing data that is suitable for the transmission of a plurality of mobile service data packets.

A further object of the present invention is to provide a digital broadcasting system and a method of processing data that can enhance the receiving performance of a digital broadcast receiving system by performing additional encoding on mobile service data and by transmitting the processed data to the receiving system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of processing data of a transmitting system includes the steps of generating a service informative null packet including service-related information of mobile service data, and multiplexing a plurality of main service data packets, a plurality of mobile service data packets, and a plurality of service informative null packets, and transmitting the multiplexed data packets to at least one transmitter located in a remote site. Herein, the service informative null packet and the mobile service data packet may be multiplexed on a one-to-one (1:1) basis, and the service informative null packet may include service-related information of the corresponding mobile service data packet, the corresponding mobile service data packet being multiplexed on a one-to-one (1:1) basis with the service informative null packet. Also, the service informative null packet may include at least an identification information for identifying a data packet as the service informative null packet, and an identification information for determining whether or not the service informative null packet includes service-related information. Furthermore, the mobile service data packet may include an identification information for identifying a data packet as the mobile service data packet.

In another aspect of the present invention, a method of processing data of a transmitting system includes the steps of generating a first service informative null packet including service-related information of mobile service data, generating a second service informative null packet not including service-related information of mobile service data, and multiplexing a plurality of main service data packets, a plurality of mobile service data packets, a plurality of first service informative null packets, and a plurality of second service informative null packets to a predetermined data rate, and transmitting the multiplexed data packets to at least one transmitter located in a remote site.

In a further aspect of the present invention, a digital broadcast transmitting system includes a service multiplexer, wherein the service multiplexer may include a main service multiplexer, a mobile service multiplexer, a service informative null packet generator, and a multiplexer. The main service multiplexer multiplexes compression encoded main service data with additional data for main service in packet units. The mobile service multiplexer multiplexes compression encoded mobile service data with additional data for mobile service in packet units. The service informative null packet generator generates at least one service informative null packet, and includes service-related information of a mobile service data packet in a service informative null packet, wherein the service informative null packet is multiplexed on a one-to-one (1:1) basis with the mobile service data packet outputted from the mobile service multiplexer, and wherein the multiplexed data packets are transmitted. The multiplexer multiplexes data packets outputted from the main service multiplexer, the mobile service multiplexer, and the service informative null packet generator at a predetermined data rate, and transmits the multiplexed data packets to at least one transmitter located in a remote site.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 illustrates a block diagram showing a structure of a service multiplexer shown in FIG. 1 according to an embodiment of the present invention;

FIG. 3 illustrates a syntax structure of a service informative null packet according to an embodiment of the present invention;

FIG. 4 illustrates a syntax structure of a service-associated information according to an embodiment of the present invention;

FIG. 7 illustrates an example of a turbo code mode according to the present invention;

FIG. 8A and FIG. 8B illustrate examples of a RS code mode according to the present invention.

DETAILED DESCRIPTION OF THE INVENTION

Figure 1:
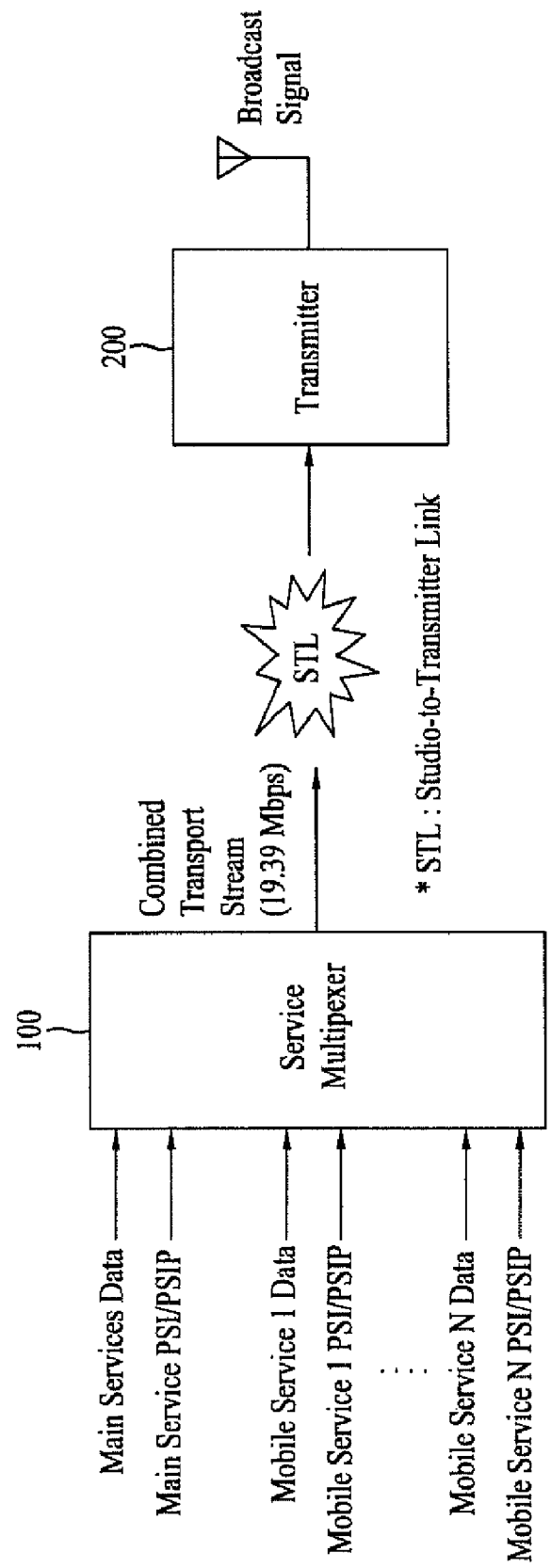
FIG. 1 illustrates a block diagram showing a general structure of a digital broadcasting system according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

In the present invention, main service data correspond to data that can be received by a conventional digital broadcast receiving system (or digital television (TV) receiver). Herein, the main service data may include audio/video (A/V) data. More specifically, high definition (HD) or standard definition (SD) A/V data may be included in the main service data. Diverse data designed (or created) to be used in data broadcasting may also be included in the main service data. Furthermore, known data correspond to data already known (or pre-known) based upon an agreement between a receiving system and a transmitting system.

Additionally, the mobile service data may either consist of data including information such as program execution files, stock information, weather forecast, and so on, or simply consist of A/V data. Particularly, the mobile service data correspond to service data required by a portable mobile broadcasting terminal. The mobile service data may consist of A/V data having lower resolution and lower data rate as compared to the A/V data included in the main service data. For example, conventional main service data may include A/V codec corresponding to a MPEG-2 codec, whereas the mobile service data may include an A/V codec having a more enhanced image (or video) compression efficiency rate, such as MPEG-4 advanced video coding (AVC) and scalable video coding (SVC). Furthermore, any type of data may be transmitted as the mobile service data. For example, a transport protocol expert group (TPEG) data for performing real-time broadcasting of transportation information may be transmitted (or serviced) as the mobile service data.

A data service using the mobile service data may include weather forecast services, traffic information services, stock information services, viewer participation quiz programs, real-time polls & surveys, interactive education broadcast programs, gaming services, services providing information on synopsis, character, background music, and filming sites of soap operas or series, services providing information on past match scores and player profiles and achievements, and services providing information on product information and programs classified by service, medium, time, and theme enabling purchase orders to be processed. Herein, the present invention is not limited only to the services mentioned above.

The present invention relates to a transmission system that can be compatible with the conventional VSB mode transmission method. Additionally, the transmission system may also multiplex the main service data and mobile service data of the same channel, and then, transmit the multiplexed data. When using the digital broadcast transmitting system according to the present invention, the mobile service data may be received while the user is in a mobile state (i.e., traveling). Also, the mobile service data may be received with stability despite the noise and diverse distortion occurring in the channel. Furthermore, the digital broadcast transmitting system according to the present invention may perform additional encoding, and insert data pre-known by both transmitting and receiving systems (i.e., known data) and transmit the processed data, thereby enhancing the receiving performance. The present invention may also generate null data packets in order to match (or put in accord) data transmission rates, when a service multiplexer within a digital broadcast transmitting system multiplexes main service data and mobile service data, thereby transmitting the multiplexed data to a transmitter. Herein, the null data packet may include information associated with the mobile service that have been previously multiplexed or that will be multiplexed in a later process.

FIG. 1 illustrates a block diagram showing a general structure of a transmitting system according to an embodiment of the present invention. Herein, the transmitting system includes a service multiplexer 100 and a transmitter 200. Herein, the service multiplexer 100 is located in the studio of each broadcast station, and the transmitter 200 is located in a specific predetermined site. The transmitter 200 may be located in a plurality of different locations. Also, the plurality of transmitters may share the same frequency. And, in this case, the plurality of transmitters receives the same signal. Accordingly, in a receiving system, a channel equalizer may compensate signal distortion, which is caused by a reflected wave, so as to recover the original signal. A variety of methods may be used for data communication each of the transmitters, which are located in remote positions, and the service multiplexer. For example, an interface standard such as a synchronous serial interface for transport of MPEG-2 data (SMPTE-310M).

At this point, the service multiplexer 100 receives at least one type of mobile service data and a program specific information/program and system information protocol (PSI/PSIP) table for each mobile service, which are then respectively encapsulated in a transport stream (TS) packet format. Also, the service multiplexer 100 receives at least one type of main service data and a program specific information/program and system information protocol (PSI/PSIP) table for each main service, which are then respectively encapsulated in a transport stream (TS) packet format. Subsequently, the TS packets are multiplexed according to a pre-determined multiplexing rule and then transmitted to the transmitter 200.

FIG. 2 illustrates a detailed block diagram of a service multiplexer according to an embodiment of the present invention. The service multiplexer includes a main service multiplexer 110, a mobile service multiplexer 120, a service informative null packet generator 130, a multiplexer 140, and a controller 150. The main service multiplexer 110 receives a variety of main service data sets and a PSI/PSIP table for the main service, thereby encapsulating each of the received set of data and PSI/PSIP table to TS packets. Thereafter, the main service multiplexer 110 multiplexes the TS packets, which are then outputted to the multiplexer 140. According to the example presented in this embodiment, the main service data are encoded and compressed so as to be inputted to the main service multiplexer 110.

The mobile service multiplexer 120 receives a variety of mobile service data sets and a PSI/PSIP table for the mobile service, thereby encapsulating each of the received set of data and PSI/PSIP table to TS packets. Thereafter, the mobile service multiplexer 120 multiplexes the TS packets, which are then outputted to the multiplexer 140. According to the example presented in this embodiment, the mobile service data are also encoded and compressed so as to be inputted to the mobile service multiplexer 120.

The multiplexer 140 multiplexes the output of the main service multiplexer 110 and the output of the mobile service multiplexer 120, thereby outputting the multiplexed data to at least one transmitter. The output data of the multiplexer 140 are configured to have a MPEG-2 TS packet format. At this point, the multiplexer 140 receives a service informative null packet outputted from the service informative null packet generator 130. Then, the multiplexer 140 may multiplex the received service informative null packet and the output data of the main service multiplexer 110 and may also multiplex the received service informative null packet and the output data of the mobile service multiplexer 120.

The service informative null packet may be generated for two purposes. Firstly, the service informative null packet may be generated in order to match (or put in accord) the output data rate to a constant and equal value. Secondly, when the mobile service multiplexer 120 multiplexes a plurality of mobile services, the service informative null packet may be generated to enable the transmitter to identify each mobile service. More specifically, when the service data being transmitted from the service multiplexer 100 to the transmitter 200 consist only of the main service data, the service multiplexer 100 may transmit main service data to the transmitter 200 at a constant data rate (e.g., at a data rate of approximately 19.39 Mbps). However, when the service multiplexer 100 multiplexes the main service data and the mobile service data and then outputs the multiplexed data to the transmitter 200, the service multiplexer 100 transmits the multiplexed main service data and mobile service data to the transmitter 200 at a data rate lower than 19.39 Mbps. This is because additional encoding is performed on the mobile service data by the transmitter 200, thereby reducing the data rate of the service multiplexer 100.

For example, when the main service data are allocated with 15 Mbps and the mobile service data, which have been additionally encoded by the transmitter 200, are allocated with the remaining 4.39 Mbps of the 19.39 Mbps, the data rate of the mobile service data multiplexed by the service multiplexer 100 becomes lower than 4.39 Mbps. As described above, this is because the amount of data is increased due to the additional encoding processed performed on the mobile service data by the transmitter 200. More specifically, if the transmitter 200 encodes the mobile service data at the coding rate of at least 1/2 coding rate, the amount of the encoded data corresponds to at least 2 times of the data amount prior to the additional encoding process. Therefore, the sum of the data rate of the main service data and the data rate of the mobile service data both being multiplexed by the service multiplexer 100 is always equal to or lower than 19.39 Mbps.

If the final output data of the service multiplexer 100 are required to be maintained at a constant data rate (e.g., 19.39 Mbps (in case of the 8VSB mode)), null data (or null data packets) may be added, thereby maintaining the data rate of the final output data at a constant data rate. In this embodiment of the present invention, the null data will be referred to as the service informative null packet. Also, in the example presented in this embodiment, the service informative null packet is generated by the service informative null packet generator 130. However, this is merely exemplary. The service informative null packet may also be generated by the mobile service multiplexer 120, or by the multiplexer 140, or may be received from an external source.

Furthermore, in the example presented in this embodiment, the data outputted from the service informative null packet generator 130 are inputted to the multiplexer 140. However, according to another embodiment of the present invention, the data outputted from the service informative null packet generator 130 may be inputted to the mobile service multiplexer 120. The output path or multiplexing rule of the data outputted from the service informative null packet generator 130 is controlled by the controller 150. The controller 150 controls null packet generation of the main service multiplexer 110, the mobile service multiplexer 120, and the multiplexer 140.

When it is assumed that the output of the service informative null packet generator 130 is inputted to the multiplexer 140 and that (19.39-K) Mbps is assigned as the output data rate of the main service multiplexer 110, as shown in FIG. 2, the sum of the output data rate of the mobile service multiplexer 120 and the output data rate of the service informative null packet generator 130 should be equal to K Mbps. Additionally, when it is assumed that the output of the service informative null packet generator 130 is inputted to the mobile service multiplexer 120 and that (19.39-K) Mbps is assigned as the output data rate of the main service multiplexer 110, the mobile service multiplexer 120 should be assigned with a data rate of K Mbps, wherein the corresponding data consist of a plurality of mobile service data sets and PSI/PSIP tables multiplexed with the service informative null packet.

Meanwhile, in order to enable the transmitter to demultiplex the output data of the service multiplexer 100, the output of the main service multiplexer 110, the output of the mobile service multiplexer 120, and the output of the service informative null packet generator 130 should each be identified from one another. Accordingly, identification information for each output data set is required. The identification information may use a value pre-decided based upon an agreement between the transmitting system and the receiving system, or the identification information may also consist of a separate set of data. Alternatively, the identification information may use a modified value of a predetermined position within the corresponding data packet. More specifically, any value that can identify each data packet may be used as the identification information. Therefore, the present invention will not be limited to the example set forth herein.

According to the embodiment of the present invention, the main service data packet being outputted from the main service multiplexer 110 and the mobile service data packet being outputted from the mobile service multiplexer 120 are respectively identified by using a synchronization byte value within the header of the corresponding data packet. For example, the value determined by the ISO/IEC13818-1 standard (e.g., 0x47) is directly outputted without modification as the synchronization byte value of the main service data packet. The same value is modified and outputted as the synchronization byte value of the mobile service data packet. Accordingly, the main service data packet and the mobile service data packet may each be identified based upon its respective value. Alternatively, the main service data packet and the mobile service data packet may also be identified by modifying and outputting the synchronization byte of the main service data packet and by directly outputting the synchronization byte of the mobile service data packet without modification.

Herein, the synchronization byte may be modified by using a variety of different methods. For example, each bit of the synchronization byte may be inversed, or only a portion of the bits included in the synchronization byte may be inversed. In the example given in the present invention, each bit of the synchronization byte is inversed so as to identify the mobile service data packet. According to an embodiment of the present invention, the synchronization byte of the main service data packet outputs the value of 0x47, and the synchronization byte of the mobile service data packet outputs a value of 0xB8 by inversing each bit configuring the mobile service data packet. Accordingly, the transmitter 200 uses the corresponding synchronization byte value to identify the main service data packet and the mobile service data packet. According to another embodiment of the present invention, each of the main service data packet and the mobile service data packet by allocating different packet identifiers (PIDs) to the main and mobile service data packets, respectively. As described above, since any value that can identify the main service data packet and the mobile service data packet may be used, the present invention is not limited only to the embodiments described above.

Furthermore, since the service informative null packet being generated from the service informative null packet generator 130 should be processed by the transmitter 200 and then removed, the present invention also requires identification information for identifying the service informative null packet. Similarly, the identification information for identifying the service informative null packet may use a value pre-decided based upon an agreement between the transmitting system and the receiving system, or the identification information may also consist of a separate set of data. Alternatively, the identification information may also use a modified value of a predetermined position within the corresponding data packet. For example, a transport error_indicator_flag may be set to '1' so as to be used as the identification information. More specifically, any value that can identify each data packet may be used as the identification information. Therefore, the present invention will not be limited to the example set forth herein.

In the example given according to the embodiment of the present invention, the transport_error_indicator flag of the header within the service informative null packet is used as the identification information for identifying the service informative null packet. In this case, the transport_error_indicator flag corresponding to the service informative null packet is set to '1', and the transport_error_indicator flags corresponding to each of the data packets other than the service informative null packet are reset to '0'. Accordingly, the service informative null packet may be identified.

Furthermore, when a plurality of mobile service data types are transmitted from the transmitter in the form of burst units, only one mobile service data type may be set to be included in one burst section. In this case, each of the plurality of mobile service data types is identified in burst units. Therefore, in order to enable the transmitter 200 to receive the plurality of mobile service data types and to transmit the received data types in burst units, each mobile service is required to be identified. For this, according to an embodiment of the present invention, the service informative null packet generator 130 may allocate at least one field in the payload portion of the corresponding service informative null packet and may also indicate information required for identifying the mobile services (e.g., mobile service identifiers) on the allocated field and output the processed data (or packet). Accordingly, by parsing the field allocated to the payload of the service informative null packet, the transmitter 200 may be capable of identifying each of the mobile service.

More specifically, if the transmitter 200 performs an additional encoding process on the mobile service data, the amount of data after the additional encoding process will be increased to at least 2 times its original amount (or size). In this case, based upon a control of the controller 150, the service informative null packet generator 130 of the service multiplexer 100 generates a number of service informative null packets exceeding the number of mobile service data packets, thereby matching the data rate of the final output data of the multiplexer 140 to a constant value. For example, the service informative null packet generator 130 generates a number of service informative null packets so that multiplexing can be performed on a one-to-one (1:1) basis between the service informative null packets and the mobile service data packets. Then, the service informative null packet generator 130 outputs the generated service informative null packets to the multiplexer 140. Herein, the transport_error_indicator flag of the header within each of the generated service informative null packets is set to '1'. Additionally, information related to the service of the corresponding mobile service data packet is also included in the pre-allocated fields of each payload.

According to an embodiment of the present invention, the information related to the service of the corresponding mobile service data packet is generated from the controller 150, which is then outputted to the service informative null packet generator 130. More specifically, each time the mobile service data packet is inputted to the multiplexer 140 to be multiplexed, the controller 150 provides the information related to the service of the corresponding mobile service data packet to the service informative null packet generator 130. Accordingly, the service informative null packet generator 130 generates the service informative null packet including the information related to the service of the corresponding mobile service data packet. The service informative null packet generator 130 then outputs the generated service informative null packet to the multiplexer 140.

Thereafter, according to the embodiment wherein the service informative null packet including the service-related information and the corresponding mobile service data packet are multiplexed on a one-to-one (1:1) basis, the service informative null packet may be outputted earlier than the corresponding mobile service data packet, or the service informative null packet may be outputted later than the corresponding mobile service data packet. More specifically, if the service informative null packet is outputted earlier than the corresponding mobile service data packet, the service informative null packet includes the service-related information of the mobile service data packet following the outputted service informative null packet. On the other hand, if the service informative null packet is outputted later than the corresponding mobile service data packet, the service informative null packet being outputted after the mobile service data packet includes the service-related information of the mobile service data packet outputted before the corresponding service informative null packet. Herein, whether the service informative null packet is to include the service-related information of the previous mobile service data or to include the service-related information of the subsequent mobile service data is decided based upon a pre-arranged agreement between the transmitting system and the receiving system.

Meanwhile, as described above, if the service informative null packet generator 130 generates the service informative null packet, so that the service informative null packet including the service-related information and the corresponding mobile service data packet can be multiplexed on a one-to-one basis, there is a possibility that the final data rate of the service multiplexer 100 will not be set to a constant data rate (e.g., 19.39 Mbps). In this case, the service informative null packet generator 130 may additionally generate service informative null packets that do not include the service-related information, thereby maintaining the final data rate to a fixed (or constant) data rate.

Herein, identification of the service informative null packet including the service-related information and the service informative null packet not including the service-related information is also required. In order to do so, the service informative null packet generator 130 should allocate at least one field to the payload portion of the service informative null packet, so as to indicate (or mark) in the field whether or not the corresponding service informative null packet includes the service-related information, thereby outputting the marked service informative null packet. Thus, by parsing the field allocated to the payload of the service informative null packet, the transmitter 200 may be able to determine whether or not the corresponding null packet include the service-related information. Meanwhile, the service-related information included in the service informative null packet may include a mobile service identifier (ID), a transmission parameter related to the corresponding mobile service data, and so on.

FIG. 3 illustrates a structure of a service_informative_null_packet( ) syntax according to an embodiment of the present invention. Herein, the service informative null packet has a fixed length of 188 bytes and broadly consists of a header and a payload. Based upon whether or not an adaptation field is included in the service informative null packet, the payload may have a variable length ranging from 0 byte to 184 bytes. In this embodiment of the present invention, an adaptation field is not included in the service informative null packet. Therefore, the service informative null packet consists of a 4-byte header and a 184-byte payload.

Referring to FIG. 3, the service informative null packet includes a sync_byte field, a transport_error_indicator field, a payload_unit_start_indicator field, a transport_priority field, a PID field, a transport_scrambling_control field, an adaptation_field_control field, a continuity_counter field, a service_info_indicator field, a service_information( ) field, and a stuffing_byte field. Herein, the sync_byte field, the transport_error_indicator field, the payload_unit_start_indicator field, the transport_priority field, the PID field, the transport_scrambling_control field, the adaptation_ field_control field, and the continuity_counter field correspond to the header, and the service_info_indicator field, the service_information( ) field, and the stuffing_byte field correspond to the payload.

In this embodiment of the present invention, the sync_byte field is an 8-bit field indicating a synchronization byte of the current service informative null packet. For example, the sync_byte field may be assigned with a field value of '0x47'. The transport_error_indicator field corresponds to a 1-bit field, which is used by the transmitter 200 to identify the service informative null packet. For example, when a service informative null packet is identified, the transport_error_indicator field is set to '1'. The payload_unit_start_indicator field may also correspond to a 1-bit field, which is used to notify the beginning (or starting point) of a packet. For example, if the packet corresponds to a service informative null packet, the payload_unit_start_indicator field is reset to '0'.

The transport_priority field is assigned with 1 bit. Herein, when packets each having the same PID exist within a transmission path, the transport_priority field indicates the priority of the packets. For example, when the transport_priority field value is equal to '1', among the packets each having the same PID, the corresponding packet will have a higher priority as compared to the packets corresponding to transport_priority=0. The PID field is a 13-bit field, which indicates a unique (or field-specific) value that can allow the current service informative null packet to be acknowledged (or identified) as a null packet. For example, the PID field may be assigned with a value of '0x1FFF'. More specifically, a null packet may also be inputted to the main service multiplexer 110. And, in this case, a value of '0x1FFF' may also be assigned to the PID field. The transport_scrambling_control field corresponds to a 2-bit field, which indicates whether or not the corresponding service informative null packet has been scrambled.

The adaptation_field_control field is a 2-bit field, which indicates whether or not an adaptation field is included in the payload portion of the corresponding service informative null packet. In the embodiment of the present invention, an adaptation field is not included in the service informative null packet. And, in this case, the adaption_field_control field may be assigned with a field value of '01'. The continuity_counter field is used in packets having the same PID. Herein, the count for the packets having the same PID increases by one. However, if the adaptation_field_control field value is equal to '00' or '10', the packet count does not increase. In other words, when a payload does not exist in the packet, the packet count does not increase. Furthermore, when the adaptation_field_control field reaches its maximum value of '15', the count cycles back to '0'.

The service_info_indicator field corresponds to a 1-bit field, which indicates whether or not the corresponding service informative null packet includes service-related information. For example, when the service_info_indicator field is assigned with a value of '1', the field indicates that service-related information is included in the service informative null packet. Herein, the service_info_indicator field is allocated to the payload portion of the corresponding service informative null packet. In this embodiment of the present invention, the sum of the one bit allocated to the service_info_indicator field and the subsequent reserved bits is set to be equal to 8 bits (i.e., 1 byte). In this case, the corresponding service informative null packet may indicate up to a maximum number of 183 bytes of the service-related information of the corresponding mobile service data packet.

The service_information( ) field corresponds to field being executed when the service_info_indicator field value is equal to '1'. Herein, the service_information( ) field may include the service-related information of the corresponding mobile service data packet. The maximum size of the service-related information being included in the service_information( ) field may be equal to 183 bytes. If the size of the service-related information is smaller than 183 bytes, the remaining bytes may be filled with stuffing bytes by the stuffing_byte field following the service_information( ) field. Herein, the stuffing_byte field is repeated as much as the lacking number of bytes, thereby maintaining the size of the payload of the corresponding service informative null packet to 184 bytes.

More specifically, the stuffing_byte field is assigned with 8 bits, which indicates data bytes used for filling (or completing) the empty data space within the payload. At this point, the value N corresponding to the number of times the stuffing_byte field is repeated (i.e., the length of the stuffing byte) represents 183—[the length of the service_information( ) field]. For example, if the service-related information is not included in the service informative null packet (i.e., if the service_info_indicator field value is equal to '0'), the value of N becomes 183. In other words, the 183 bytes of the payload within the corresponding service informative null packet are completed with the stuffing bytes. For example, if the length of the service_information( ) field is equal to 6 bytes, the 177 bytes that are lacking from the payload of the corresponding service information null packet are filled (or completed) with stuffing bytes.

The order, position, and definition of the fields allocated to the service informative null packet described in FIG. 3 are merely examples presented to facilitate and simplify the understanding of the present invention. In other words, the order, position, and definition of the fields allocated to the service informative null packet may be easily altered or modified by the system designer. Therefore, the present invention will not be limited to the examples given in the above-described embodiment of the present invention.

FIG. 4 illustrates a syntax structure of the service_information( ) field, when the value of the service_info_indicator field is equal to '1'. Referring to FIG. 4, the service_information( ) field includes a service_information_length field, a service_id field, a number_of_services field, a group_region_distinction flag field, a group_region_id field, a super_frame_size field, a burst_size field, a turbo_code_mode field, and a RS_code_mode field. Herein, the terminology mentioned in the service_information( ) field, such as group, region, super frame, burst, turbo code mode, RS code mode, and so on, will be briefly described while describing each of the corresponding fields. Furthermore, the above-mentioned terms will be described in more detail when describing the transmitter 200 with reference to FIG. 5 in a later process.

In the embodiment of the present invention, the service_information_length field is an 8-bit field, which indicates the total length of the corresponding service_information( ) field. The service_id field is also an 8-bit field, which indicates a mobile service identifier (i.e., mobile service ID) that can solely identify each of the mobile services. The number_of_services field is also assigned with 8 bits. Herein, the number_of_services field indicates the type of mobile service being multiplexed by the mobile service multiplexer 120. For example, when 4 different types of mobile service data are being inputted, the value of the number_of_services field is equal to '4(=00000100)'.

The group_region_distinction flag field is a 1-bit field, which indicates whether or not a distinction is made for each region corresponding to a mobile service data type, when the mobile service data are being transmitted. In the present invention, when the value of the group_region_distinction flag field is equal to '1', a distinction is made for the regions of the corresponding mobile service data packet. Thereafter, the corresponding mobile service data packet is transmitted. Alternatively, when the value of the group_region_distinction flag field is equal to '0', the mobile service data packet is transmitted without any distinction made for the regions. In this case, the group_region_id field may be disregarded (or ignored). The group_region_id field is assigned with one bit.

The group_region_id field indicates to which region within the data group the corresponding mobile service data packet is being allocated and transmitted. For example, when the value of the group_region_id field is equal to '1', the corresponding mobile service data packet is allocated to region A/B and transmitted. Alternatively, when the value of the group_region_id field is equal to '0', the corresponding mobile service data packet is allocated to region C and transmitted. Herein, 2 reserved bits may be allocated after the group_region_id field.

The super_frame_size field is a 4-but field, which indicates the size of a super frame. More specifically, the transmitter 200 configures a RS frame so as to perform error correction encoding. Then, the transmitter 200 groups a plurality of error correction encoded RS frames, thereby configuring a super frame. The transmitter 200 may perform interleaving processes in super frame units. In this case, the super_frame_size field indicates the number of RS frames configuring the super frame. Furthermore, the super_frame_size field corresponds to one of the transmission parameters being transmitted along with the mobile service data, when the corresponding mobile service data are transmitted to the receiving system from the transmitter 200. The burst_size field is a 6-bit field, which indicates the size of a burst. More specifically, when the transmitter 200 transmits the mobile service data in burst units, the burst_size field indicates the number of data groups configuring a burst-on section. The burst_size field also corresponds to one of the transmission parameters being transmitted along with the mobile service data, when the corresponding mobile service data are transmitted to the receiving system from the transmitter 200. Herein, 3 reserved bits may be allocated after the burst_size field.

The turbo_code_mode field is a 3-bit field, which indicates the turbo code mode applied to each region within the data group. FIG. 7 illustrates a table showing an example of a turbo code mode being applied to regions A/B and to region C. For example, when the value of the turbo_code_mode field is equal to '001', the transmitter 200 encodes the mobile service data that are to be allocated to regions A/B at a coding rate of 1/2 and encodes the mobile service data that are to be allocated to region C at a coding rate of 1/4. The RS_code_mode field is a 4-bit field, which indicates the RS code mode applied to each region within the data group. FIG. 8A illustrates an example of a RS code mode being applied to regions A/B. And, FIG. 8B illustrates an example of a RS code mode being applied to region C. For example, when the value of the RS_code_mode field is equal to '1101', the transmitter 200 performs (235,187)-RS encoding on a RS frame that is to be allocated to regions A/B. The transmitter 200 then performs (211,187)-RS encoding on a RS frame that is to be allocated to region C.

The order, position, and definition of the fields allocated to the service_information( ) field described in FIG. 4 are merely examples presented to facilitate and simplify the understanding of the present invention. In other words, the order, position, and definition of the fields allocated to the service_information( ) field may be easily altered or modified by the system designer. Therefore, the present invention will not be limited to the examples given in the above-described embodiment of the present invention.

As described above, the controller 150 generates service-related information of the corresponding mobile service data packet, which is to be multiplexed on a one-to-one (1:1) basis, and outputs the generated service-related information to the service informative null packet generator 130, as shown in FIG. 4. Accordingly, the service informative null packet generator 130 generates the service informative null packet including the service-related information of the corresponding mobile service data packet, as shown in FIG. 3. Thereafter, the service informative null packet generator 130 outputs the generated service informative null packet to the multiplexer 140. At this point, the service_info_indicator field of the service informative null packet is set to '1' and then outputted to the multiplexer 140.

Based upon the control of the controller 150, the multiplexer 140 first outputs the service-related information of the corresponding mobile service data packet. Thereafter, the multiplexer 140 outputs the service informative null packet. In this case, the service informative null packet having the service_info_indicator field value of '1' includes the service-related information of the mobile service data packet that is outputted immediately before the corresponding service informative null packet (i.e., the previous mobile service data packet). Accordingly, the transmitter 200 considers the service-related information being extracted from the service informative null packet received immediately after the mobile service data packet (i.e., the next service informative null packet) as the service-related information of the previous mobile service data packet. Then, the transmitter 200 performs the required processes on the received data.

Conversely, the controller 150 first outputs the service informative null packet. Thereafter, the controller 150 may be able to control the multiplexer 140 so that the mobile service data packet corresponding to the service-related information included in the service informative null packet can be outputted. In this case, the service informative null packet having the service_info_indicator field value of '1' includes the service-related information of the mobile service data packet that is outputted immediately after the corresponding service informative null packet (i.e., the next mobile service data packet).

Meanwhile, when the service informative null packet generator 130 generates a service informative null packet, so that the service informative null packet including the service-related information and the corresponding mobile service data packet can be multiplexed, as described above, there is a possibility that the final data rate of the service multiplexer 100 will not be set to a constant data rate (e.g., 19.39 Mbps). In this case, the service informative null packet generator 130 may additionally generate service informative null packets that do not include the service-related information, thereby maintaining the final data rate to a fixed (or constant) data rate. Also, in this case, the service_info_indicator field value is reset to '0' and then outputted to the multiplexer 140. In this embodiment of the present invention, the service informative null packet including service-related information and the service informative null packet not including service-related information are distinguished (or identified) by using the service_info_indicator field. Herein, the transmitter 200 refers to the service_info_indicator field value in order to determine whether or not service-related information is included in the corresponding service informative null packet.

Figure 5:
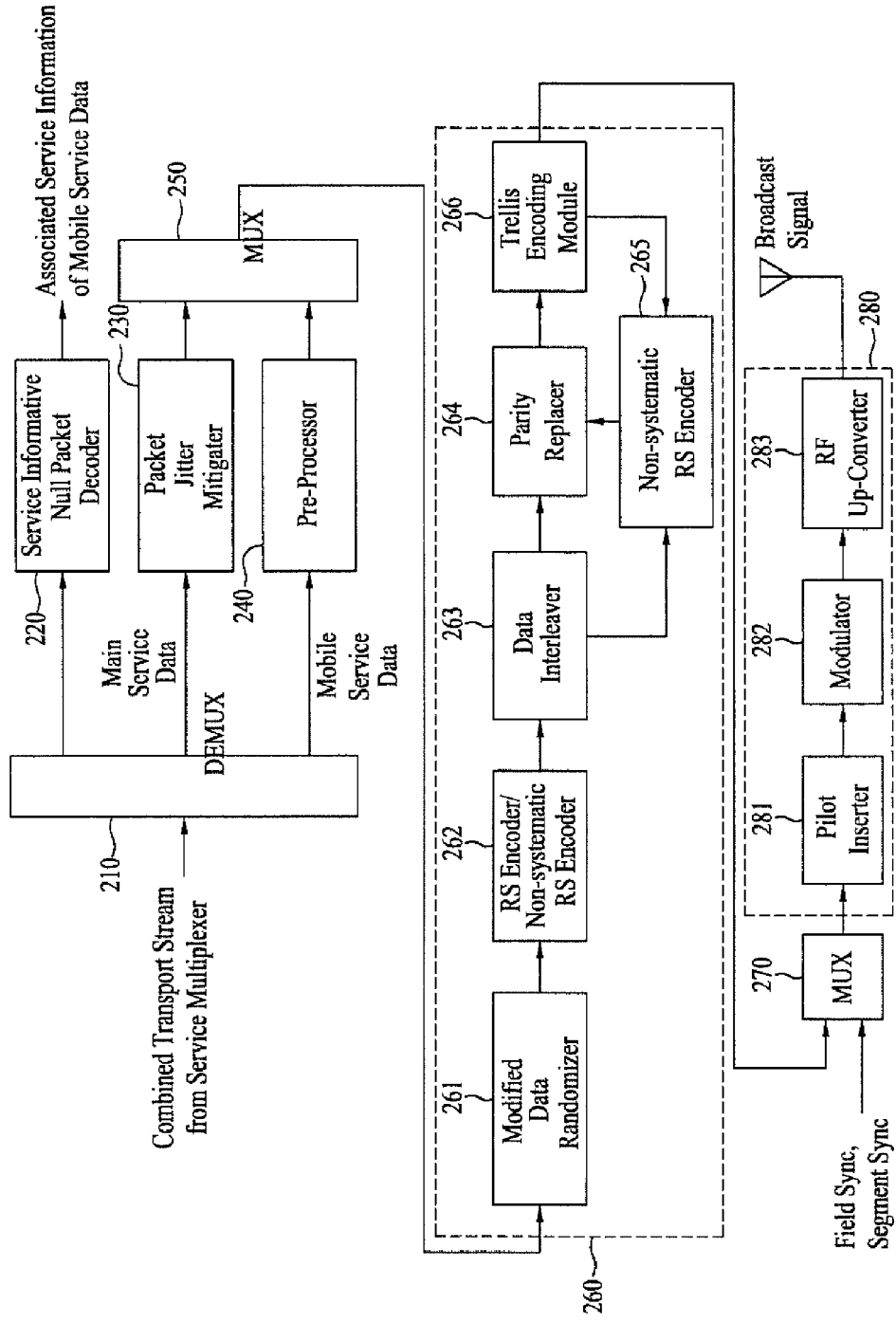
FIG. 5 illustrates a block diagram showing a structure of a transmitter shown in FIG. 1 according to an embodiment of the present invention.

FIG. 5 illustrates a block diagram showing a structure of the transmitter 200 according to an embodiment of the present invention. Referring to FIG. 5, the transmitter 200 includes a demultiplexer 210, a service informative null packet decoder 220, a packet jitter mitigator 230, a pre-processor 240, a packet multiplexer 250, a post-processor 260, a frame multiplexer 270, and a transmitting unit 280. When the demultiplexer 210 receives a data packet from the service multiplexer 100, the demultiplexer 210 is required to determined whether the received data packet corresponds to a main service data packet, a mobile service data packet, or a service informative null packet.

In this embodiment, the demultiplexer 210 parses the sync_byte field included in the received data packet in order to identify the mobile service data packet. Alternatively, the demultiplexer 210 parses the transport_error_indicator field included in the received data packet in order to identify the service informative null packet. For example, when the sync_byte field value of the received data packet is equal to a bitwise inversion of '0x47' (i.e., equal to '0xB8'), the demultiplexer 210 identifies the corresponding data packet as the mobile service data packet and outputs the identified mobile service data packet to the pre-processor 240. On the other hand, when the transport_error_indicator field value of the received data packet is equal to '1', the demultiplexer 210 identifies the corresponding data packet as the service informative null packet and outputs the identified service informative null packet to the service informative null packet decoder 220. Furthermore, when the sync_byte field value of the received data packet is equal to '0x47' and when the transport_error_indicator field value of the same data packet is equal to '0', the demultiplexer 210 identifies the corresponding data packet as the main service data packet and outputs the identified main service data packet to the packet jitter mitigator 230.

When the service informative null packet decoder 220 receives the service informative null packet from the demultiplexer 210, the service informative null packet decoder 220 parses the service_info_indicator field included in the corresponding service informative null packet, so as to determine whether or not service-related information is included in the data packet. For example, when the service_info_indicator field value is equal to '1', the service_info_indicator field is followed by the service_information( ) field, thereby indicating that the service-related information is included in the corresponding field. Conversely, when the service_info_indicator field value is equal to '0', the service_info_indicator field is followed by meaningless (or insignificant) null data, thereby indicating that the remaining portion of the service_info_indicator field is completed (or filled) with stuffing bytes.

Therefore, when the service_info_indicator field value is equal to '1', the service informative null packet decoder 220 extracts service-related information from the service_information( ) field, as shown in FIG. 4. Subsequently, the service informative null packet decoder 220 provides the extracted service-related information to the block requiring the information, such as the demultiplexer 210, the pre-processor 240, and so on. Thereafter, the service informative null packet decoder 220 discards (or deletes) the corresponding service informative null packet. Furthermore, when the service_info_indicator field value is equal to '0', the service informative null packet decoder 220 also discards (or deletes) the service informative null packet including null data inserted by the service multiplexer 100 in order to match (or put in accord) the data rate.

In this embodiment of the present invention, when the service informative null packet decoder 220 parses the service_information_length field, the total length of the service-related information can be determined. When the service informative null packet decoder 220 parses the service_id_field, identifiers for identifying each mobile service can be known. When the service informative null packet decoder 220 parses the number_of_services field, the number of mobile services can be determined. Also, by parsing the group_region_distinction flag field, the service informative null packet decoder 220 may determine whether or not the regions included in the mobile service data packet have been distinguished (or identified) prior to being transmitted. When the service informative null packet decoder 220 parses the group_region_id field, the service informative null packet decoder 220 can determine to which region within the data group the mobile service data packet is being transmitted.

Furthermore, by parsing the super_frame_size field, the service informative null packet decoder 220 can determine the number of RS frames included in a single super frame. Also, when the service informative null packet decoder 220 parses the burst_size field, the service informative null packet decoder 220 can determine the number of data groups included in a single burst. By parsing the turbo_code_mode field, the service informative null packet decoder 224 can determined the turbo code of the corresponding mobile service data packet. Finally, when the service informative null packet decoder 220 parses the RS_code_mode field, the service informative null packet decoder 220 can determined the RS code of the corresponding mobile service data packet.

The pre-processor 240 performs additional encoding on the mobile service data packet being demultiplexed and outputted from the demultiplexer 210. Thereafter, the pre-processor 240 outputs the processed mobile service data packet to the packet multiplexer 250. This is to enable the mobile service data to respond more effectively to noise and channel environment that undergoes frequent changes. At this point, when performing the additional encoding process, the pre-processor 240 may refer to the service-related information provided by the service informative null packet decoder 220.

Figure 6:
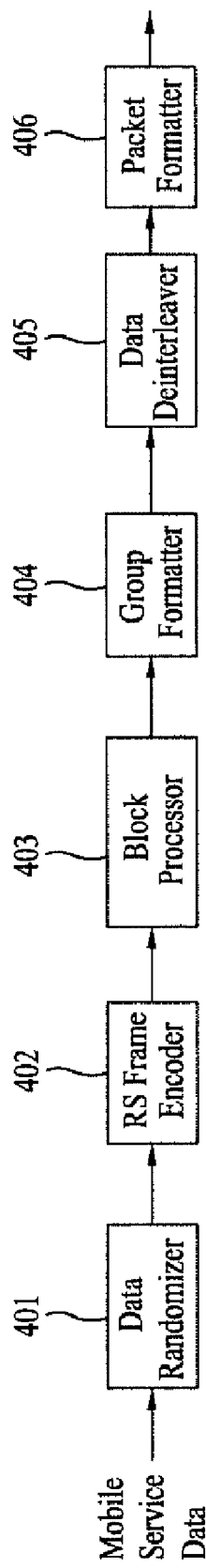
FIG. 6 illustrates a block diagram showing a structure of a pre-processor shown in FIG. 5 according to an embodiment of the present invention.

FIG. 6 illustrates a block diagram of the pre-processor 240 according to an embodiment of the present invention. Herein, the pre-processor 240 includes a data randomizer 401, a RS frame encoder 402, a block processor 403, a group formatter 404, a data deinterleaver 405, and a packet formatter 406. The pre-processor 240 according to the embodiment of the present invention refers to the service-related information outputted from the service informative null packet decoder 220, so as to perform the additional encoding process. More specifically, the data randomizer 401 receives mobile service data through the demultiplexer 210 and randomizes the received mobile service data thereby outputting the processed data to the RS frame encoder 402. At this point, by having the data randomizer 401 randomize the mobile service data, a later randomizing process on the mobile service data performed by the data randomizer 261 of the post-processor 260 may be omitted.

The RS frame encoder 402 groups a plurality of the received mobile service data packets that have been randomized. Then, the RS frame encoder 402 performs at least one of an error correction encoding process and an error detection encoding process on the received randomized mobile service data. Furthermore, the RS frame encoder 402 may also group a plurality of RS frames so as to configure a super frame, thereby performing interleaving (or permutation) processes in super frame units. Thus, by providing robustness on the mobile service data, a group error that may occur due to a change in the frequency environment can be scattered, thereby enabling the corresponding data to respond to the severely vulnerable and frequently changing frequency environment.

In the RS frame encoder 402 according to the embodiment of the present invention, RS encoding is applied as the error correction encoding process, and cyclic redundancy check (CRC) encoding is applied as the error detection encoding process. When performing RS encoding, parity data that are to be used for error correction are generated. And, when performing CRC encoding, CRC data that are to be used for error detection are generated. Also, in the present invention, the RS encoding will be adopting a forward error correction (FEC) method. The FEC corresponds to a technique for compensating errors that occur during the transmission process. The CRC data generated by CRC encoding may be used for indicating whether or not the mobile service data have been damaged by the errors while being transmitted through the channel. In the present invention, a variety of error detection coding methods other than the CRC encoding method may be used, or the error correction coding method may be used to enhance the overall error correction ability (or performance) of the receiving system.

Furthermore, according to an embodiment of the present invention, it is assumed that two types of mobile service data are transmitted from the service multiplexer 100. Herein, it is assumed that one mobile service data type is allocated from the group formatter 404 to regions A/B within the data group, and that the other mobile service data type is allocated to region C. It is also assumed that a group_region_distinction flag field value of a '1', a group_region_id field value of '1', a turbo_code_mode field value of '001', and a RS_code_mode field value of '1110' have been extracted from the service-related information of the service informative null packet corresponding to the mobile service data packet being inputted to the RS frame encoder 402.

Accordingly, the mobile service data packet represents the data that are to be allocated to regions A/B within the data group of the group formatter 404. In this case, the RS frame encoder 402 performs (235,187)-RS encoding on the RS frame including the mobile service data packet, as shown in FIG. 8A, thereby generating 48 parity data bytes. Alternatively, if the mobile service data packet corresponds to the data that are to be allocated to region C, the RS frame encoder 402 performs (223,187)-RS encoding on the RS frame including the mobile service data packet, as shown in FIG. 8B, thereby generating 36 parity data bytes.

Further, the RS frame encoder 402 groups RS frames corresponding to the value extracted from the super_frame_size field so as to configure a super frame, thereby performing interleaving (or permutation) processes in super frame units. More specifically, when the RS frame encoder 402 performs the interleaving process by permuting each column of the super frame based upon a predetermined permutation rule, the position of each row within the super frame after the interleaving process may differ from the position prior to the interleaving process. By performing the interleaving process in super frame units, even though the section having a plurality of errors occurring therein becomes very long, and even though the number of errors included in the RS frame that is to be decoded exceeds the extent of being able to be corrected, the errors become dispersed within the entire super frame. Thus, the decoding ability is even more enhanced as compared to a single RS frame.

As described above, the mobile service data encoded by the RS frame encoder 402 are inputted to the block processor 403. The block processor 403 then encodes the inputted mobile service data at a coding rate of G/H (wherein, G is smaller than H (i.e., G<H)) and then outputted to the group formatter 404. More specifically, the block processor 403 divides the mobile service data being inputted in byte units into bit units. Then, the G number of bits is encoded to H number of bits. Thereafter, the encoded bits are converted back to byte units and then outputted. For example, if 1 bit of the input data is coded to 2 bits and outputted, then G is equal to 1 and H is equal to 2 (i.e., G=1 and H=2). Alternatively, if 1 bit of the input data is coded to 4 bits and outputted, then G is equal to 1 and H is equal to 4 (i.e., G=1 and H=4). Hereinafter, the former coding rate will be referred to as a coding rate of 1/2 (1/2-rate coding), and the latter coding rate will be referred to as a coding rate of 1/4 (1/4-rate coding), for simplicity.

Herein, when using the 1/4 coding rate, the coding efficiency is greater than when using the 1/2 coding rate, and may, therefore, provide greater and enhanced error correction ability. For such reason, when it is assumed that the data encoded at a 1/4 coding rate in the group formatter 404, which is located near the end portion of the system, are allocated to a region in which the receiving performance may be deteriorated, and that the data encoded at a 1/2 coding rate are allocated to a region having excellent receiving performance, the difference in performance may be reduced.

At this point, the block processor 403 may vary the coding rate of the mobile service data that are to be allocated to each region based upon the turbo_code_mode field value extracted from the service-related information of the service informative null packet. For example, when the turbo_code_mode field value is equal to '001', the group formatter 404 performs 1/2-rate coding of the mobile service that that are to be allocated to regions A/B and performs 1/4-rate coding on the mobile service data that are to be allocated to region C. Meanwhile, the group formatter 404 inserts mobile service data that are outputted from the block processor 403 in corresponding regions within a data group, which is configured in accordance with a pre-defined rule. Also, with respect to the data deinterleaving process, each place holder or known data are also inserted in corresponding regions within the data group. At this point, the data group may be divided into at least one hierarchical region. Herein, the type of mobile service data being inserted to each region may vary depending upon the characteristics of each hierarchical region. For example, each region may be divided based upon the receiving performance within the data group.

As the described above, in the embodiment of the present invention, the data configuration prior to the data deinterleaving process is divided into regions A, B, and C. Herein, reference is made on the service-related information decoded by the service informative null packet decoder so as to perform the RS encoding and block encoding processes, thereby allocating the received mobile service data to each of the corresponding regions. More specifically, the regions A, B, and C are divided according to regions having similar receiving performances within the data group.

Herein, the data group is divided into a plurality of different regions so that each region can be used for different purposes. More specifically, a region having less or no interference from the main service data may provide a more enhanced (or powerful) receiving performance as compared to a region having relatively more interference from the main service data. Furthermore, when using a system inserting and transmitting known data into the data group, and when a long known data sequence is to be consecutively inserted into the mobile service data, a known data sequence having a predetermined length may be consecutively inserted into a region having no interference from the main service data. Conversely, in case of the regions having interference from the main service data, it is difficult to consecutively insert long known data sequences and to periodically insert the known data into the corresponding regions due to the interference from the main service data.

In addition, apart from the encoded mobile service data outputted from the block processor 403, the group formatter 404 also inserts MPEG header place holders, non-systematic RS parity place holders, main service data place holders, which are related to data deinterleaving in a later process. Herein, the main service data place holders are inserted because the mobile service data bytes and the main service data bytes are alternately mixed with one another based upon the input of the data deinterleaver. For example, based upon the data outputted after the data-deinterleaving process, the place holder for the MPEG header may be allocated at the very beginning of each packet.

Furthermore, the group formatter 404 either inserts known data generated in accordance with a pre-determined method or inserts known data place holders for inserting the known data in a later process. Additionally, place holders for initializing the trellis encoding module 266 of the post-processor 260 are also inserted in the corresponding regions. For example, the initialization data place holders may be inserted in the beginning of the known data sequence. Herein, the size of the mobile service data that can be inserted in a data group may vary in accordance with the sizes of the trellis initialization data or known data, MPEG headers, and RS parity data.

The data outputted from the group formatter 404 are inputted to the data deinterleaver 405. And, the data deinterleaver 405 deinterleaves data by performing an inverse process of the data interleaver on the data and place holders within the data group, which are then outputted to the packet formatter 406. The packet formatter 406 removes the main service data place holders and the RS parity place holders that were allocated for the deinterleaving process from the deinterleaved data being inputted. Then, the packet formatter 406 groups the remaining portion and replaces the 4-byte MPEG header place holder with an MPEG, Also, when the group formatter 404 inserts known data place holders, the packet formatter 406 may insert actual known data in the known data place holders, or may directly output the known data place holders without any modification in order to make replacement insertion in a later process. Thereafter, the packet formatter 406 identifies the data within the packet-formatted data group, as described above, as a 188-byte unit mobile service data packet (i.e., MPEG TS packet), which is then provided to the packet multiplexer 250.

The packet multiplexer 250 multiplexes the mobile service data packet outputted from the packet formatter 406 and the main service data in accordance with a pre-defined multiplexing method. Then, the packet multiplexer 250 outputs the multiplexed data packets to the data randomizer 261 of the post-processor 260. Herein, the multiplexing method may vary in accordance with various variables of the system design. One of the multiplexing methods of the packet multiplexer 250 consists of providing a burst section along a time axis and, then, transmitting a plurality of data groups during a burst-on section and transmitting only the main service data during a burst-off section. At this point, main service data may also be transmitted in the burst-on section. Furthermore, the packet multiplexer 250 can determined the number of data groups included in a single burst based upon the service-related information decoded by the service informative null packet decoder 220 (e.g., the burst_size field).

In this case, mobile service data and main service data co-exist in a burst-on section, and only the main service data exist in the burst-off section. Therefore, the main service data section transmitting the main service data exist in both the burst-on section and the burst-off section. At this point, the number of main service data packets included in the main service data section within the burst-on section and the number of main service data packets included in the main service data section within the burst-off section may be equal to or different from one another. When the mobile service data are transmitted in burst units, as described above, a receiving system that only receives the mobile service data may turn on the power only during the burst-on section so as to receive the corresponding data. Also, in this case, the receiving system may turn off the power during burst-off sections, thereby preventing the main service data from being received. Thus, the receiving system is capable of reducing excessive power consumption.

However, since a data group including mobile service data in-between the data bytes of the main service data during the packet multiplexing process, the shifting of the chronological position (or place) of the main service data packet becomes relative. Also, a system object decoder (i.e., MPEG decoder) for processing the main service data of the receiving system, receives and decodes only the main service data and recognizes the mobile service data packet as a null data packet. Therefore, when the system object decoder of the digital broadcast receiving system receives a data group including mobile service data and a main service data packet that is multiplexed with the data group, a packet jitter occurs.

At this point, since a multiple-level buffer for the video data exists in the system object decoder and the size of the buffer is relatively large, the packet jitter generated from the packet multiplexer 250 does not cause any serious problem in case of the video data. However, since the size of the buffer for the audio data is relatively small, the packet jitter may cause some problem. More specifically, due to the packet jitter, an overflow or underflow may occur in the buffer for the main service data of the digital broadcast receiving system (e.g., the buffer for the audio data). Therefore, the packet jitter mitigator 230 re-adjusts the relative position of the main service data packet so that the overflow or underflow does not occur in the system object decoder.

In the present invention, examples of repositioning places for the audio data packets within the main service data in order to minimize the influence on the operations of the audio buffer will be described in detail. The packet jitter mitigator 230 repositions audio packets of the main service data section so that the audio data packets of the main service can be positioned as equally and uniformly as possible. The standard for repositioning the audio data packets in the main service data performed by the packet jitter mitigator 230 will now be described. Herein, it is assumed that the packet jitter mitigator 230 knows the same multiplexing information as that of the packet multiplexer 250, which is placed further behind the packet jitter mitigator 230.

Firstly, if one audio data packet exists in the main service data section (e.g., the main service data section positioned between two data groups) within the burst-on section, the audio data packet is positioned at the very beginning of the main service data section. Alternatively, if two audio data packets exist in the corresponding data section, one audio data packet is positioned at the very beginning and the other audio data packet is positioned at the very end of the main service data section. Further, if more than three audio data packets exist, one audio data packet is positioned at the very beginning of the main service data section, another is positioned at the very end of the main service data section, and the remaining audio data packets are positioned between the first and last audio data packets at equal intervals.

Secondly, during the main service data section before the beginning of a burst-on section, the audio data packet is placed at the very end of the main service data section. Thirdly, during a main service data section after the end of burst-on section, the audio data packet is positioned at the very beginning of the main service data section. And, finally, the data packets other than audio data packets are positioned to vacant spaces (i.e., spaces that are not designated for the audio data packets) in accordance with the inputted order.

Meanwhile, when the positions of the main service data packets are relatively re-adjusted, associated program clock reference (PCR) values may also be modified accordingly. The PCR value corresponds to a time reference value for synchronizing the time of the MPEG decoder. Herein, the PCR value is inserted in a specific region of a TS packet and then transmitted. In the embodiment of the present invention, the packet jitter mitigator 230 may also perform the function of correcting (or modifying) the PCR value.

The data outputted from the packet jitter mitigator 230 are inputted to the packet multiplexer 250. As described above, the packet multiplexer 250 multiplexes the main service data packet outputted from the packet jitter mitigator 230 with the mobile service data packet outputted from the pre-processor 240 into a burst structure in accordance with a pre-determined multiplexing rule. Then, the packet multiplexer 250 outputs the multiplexed data packets to the data randomizer 261 of the post-processor 260.

If the inputted data correspond to the main service data packet, the data randomizer 261 performs the same randomizing process as that of the conventional randomizer. More specifically, the synchronization byte within the main service data packet is deleted. Then, the remaining 187 data bytes are randomized by using a pseudo random byte generated from the data randomizer 261. Thereafter, the randomized data are outputted to the RS encoder/non-systematic RS encoder 262. On the other hand, if the inputted data correspond to the mobile service data packet, the data randomizer 261 deletes the synchronization byte from the 4-byte MPEG header included in the mobile service data packet and, then, performs the randomizing process only on the remaining 3 data bytes of the MPEG header. Thereafter, the randomized data bytes are outputted to the RS encoder/non-systematic RS encoder 262.

Additionally, the randomizing process is not performed on the remaining portion of the mobile service data excluding the MPEG header. In other words, the remaining portion of the mobile service data packet is directly outputted to the RS encoder/non-systematic RS encoder 262 without being randomized. This is because a randomizing process has already been performed on the mobile service data in the data randomizer 401. Also, the data randomizer 261 may or may not perform a randomizing process on the known data (or known data place holders) and the initialization data place holders included in the mobile service data packet.

The RS encoder/non-systematic RS encoder 262 performs an RS encoding process on the data being randomized by the data randomizer 261 or on the data bypassing the data randomizer 261, so as to add 20 bytes of RS parity data. Thereafter, the processed data are outputted to the data interleaver 263. Herein, if the inputted data correspond to the main service data packet, the RS encoder/non-systematic RS encoder 262 performs the same systematic RS encoding process as that of the conventional system, thereby adding the 20-byte RS parity data at the end of the 187-byte data. Alternatively, if the inputted data correspond to the mobile service data packet, the RS encoder/non-systematic RS encoder 262 performs a non-systematic RS encoding process. At this point, the 20-byte RS parity data obtained from the non-systematic RS encoding process are inserted in a pre-decided parity byte place within the mobile service data packet.

The data interleaver 263 corresponds to a byte unit convolutional interleaver. The output of the data interleaver 263 is inputted to the parity replacer 264 and to the non-systematic RS encoder 265. Meanwhile, a process of initializing a memory within the trellis encoding module 266 is primarily required in order to decide the output data of the trellis encoding module 266, which is located after the parity replacer 264, as the known data pre-defined according to an agreement between the receiving system and the transmitting system. More specifically, the memory of the trellis encoding module 266 should first be initialized before the received known data sequence is trellis-encoded. At this point, the beginning portion of the known data sequence that is received corresponds to the initialization data place holder and not to the actual known data. Herein, the initialization data place holder has been included in the data by the group formatter 404 in an earlier process. Therefore, the process of generating initialization data and replacing the initialization data place holder of the corresponding memory with the generated initialization data are required to be performed immediately before the inputted known data sequence is trellis-encoded.

Additionally, a value of the trellis memory initialization data is decided and generated based upon a memory status of the trellis encoding module 266. Further, due to the newly replaced initialization data, a process of newly calculating the RS parity and replacing the RS parity, which is outputted from the data interleaver 263, with the newly calculated RS parity is required. Therefore, the non-systematic RS encoder 265 receives the mobile service data packet including the initialization data place holders, which are to be replaced with the actual initialization data, from the data interleaver 263 and also receives the initialization data from the trellis encoding module 266.

Among the inputted mobile service data packet, the initialization data place holders are replaced with the initialization data, and the RS parity data that are added to the mobile service data packet. Thereafter, a new non-systematic RS parity is calculated and then outputted to the parity replacer 264. Accordingly, the parity replacer 264 selects the output of the data interleaver 263 as the data within the mobile service data packet, and the parity replacer 264 selects the output of the non-systematic RS encoder 265 as the RS parity data. Then, the selected data are outputted to the trellis encoding module 266.

Meanwhile, if the main service data packet is inputted or if the mobile service data packet, which does not include any initialization data place holders that are to be replaced, is inputted, the parity replacer 264 selects the data and RS parity that are outputted from the data interleaver 263. Then, the parity replacer 264 directly outputs the selected data to the trellis encoding module 266 without any modification. The trellis encoding module 266 converts the byte-unit data to symbol units and performs a 12-way interleaving process so as to trellis-encode the received data. Thereafter, the processed data are outputted to the frame multiplexer 270. The frame multiplexer 270 inserts a field synchronization signal and a segment synchronization signal to the data outputted from the trellis encoding module 266 and, then, outputs the processed data to the pilot inserter 281 of the transmitting unit 280. Herein, the data having a pilot inserted by the pilot inserter 281 are modulated by the modulator 282 in accordance with a pre-decided modulating method (e.g., VSB method). Thereafter, the modulated data are transmitted to each receiving system through the radio frequency (RF) up-converter 283.

Meanwhile, in order to allow the receiving system to correctly (or properly) process the mobile service data, the known data the main service data, and so on according to the present invention, the receiving system should accurately recognize (or acknowledge) the transmission parameters used by the transmitting system. Herein, the transmission parameters may not only include the transmitted service-related information included in the service informative null packet but also include information predetermined by the transmitter 200, information that may be obtained during data processing, and so on.

For example, the transmission parameter may include the number of RS frames configuring a super frame, RS code mode information, turbo code mode information, whether or not a checksum has been used, the checksum being added to determine the presence of an error in a row direction within the RS frame, the type and size of the checksum if the checksum is used, the number of data groups configuring one RS frame, burst period (herein, one burst cycle period corresponds to the total number of fields starting from the beginning of a current burst up to the beginning of the next burst), and a positioning order of the RS frames that are currently being transmitted within a super frame (i.e., a permuted frame index (PFI)) or a positioning order of groups that are currently being transmitted within a RS frame (burst). Such transmission parameters may be included in the service-related information of the service informative null packet and then transmitted to the transmitter 200. Alternatively, the transmission parameters may also be pre-stored or predetermined in the transmitter 200.

According to the embodiment of the present invention, the transmission parameter may be inserted by allocating a mobile service data packet or a specific region within the data group. In this case, the pre-processor 240 may consider the transmission parameter as the equivalent of the mobile service data, thereby processing the transmission parameters accordingly. Also, the transmission parameter may also be inserted after being multiplexed with other data types. For example, when the known data and the mobile service data are multiplexed, the transmission parameter may be inserted in a position for inserting the known data as a replacement of the known data. Alternatively, a combination of the transmission parameter and known data may be inserted in the position for inserting the known data. Furthermore, the transmission parameter may be inserted in the field synchronization segment of the transmission frame by allocating a portion of the reserved region.

Meanwhile, when the transmission parameter is inserted in the field synchronization segment region or in the known data region and, then, transmitted, the reliability may be deteriorated when the transmission parameter passes through the transmission channel. Therefore, one of a plurality of pre-defined patterns may be inserted in accordance with the transmission parameter. In this case, the receiving system performs correlation operation between the receiving signal and the pre-defined patterns, thereby enabling the transmission parameters to be recognized (or acknowledged).

Figure 9:
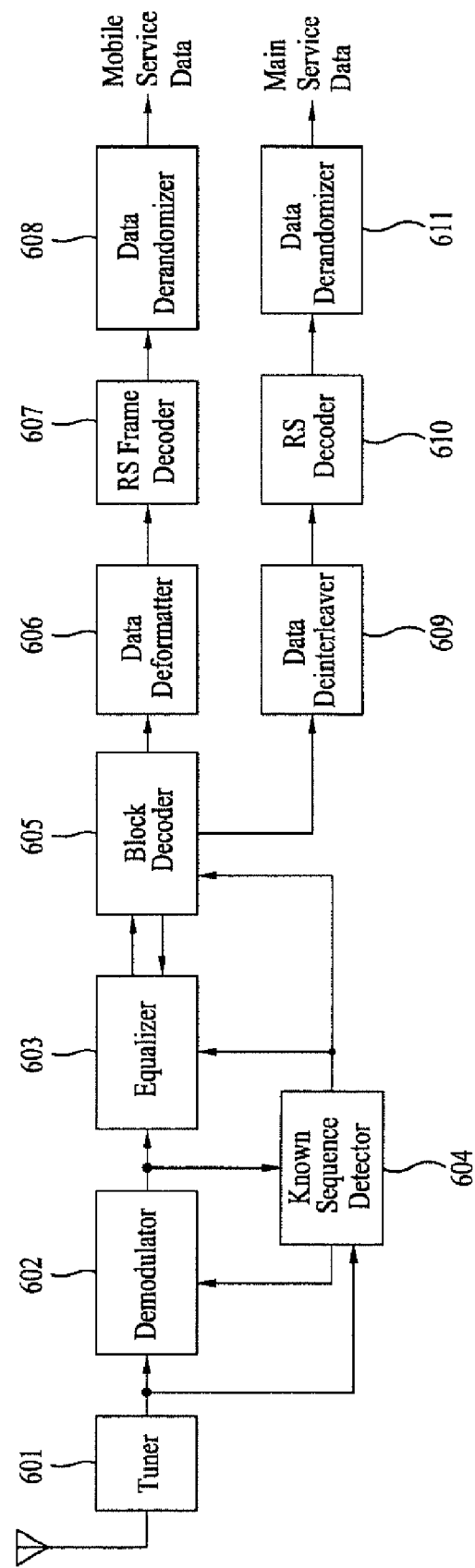
FIG. 9 illustrates a block diagram showing a structure of a digital broadcast receiving system according to an embodiment of the present invention.

FIG. 9 illustrates a block diagram showing a structure of a receiving system according to the present invention. The receiving system of FIG. 9 uses known data information, which is inserted in the mobile service data section and, then, transmitted by the transmitting system, so as to perform carrier recovery, timing recovery, frame synchronization recovery, and channel equalization, thereby enhancing the receiving performance. Referring to FIG. 9, the receiving system includes a tuner 601, a demodulator 602, an equalizer 603, a known data detector (or known sequence detector) 604, a block decoder 605, a data deformatter 606, a RS frame decoder 607, a mobile service data derandomizer 608, a data deinterleaver 609, a RS decoder 610, and a main service data derandomizer 611. Herein, for simplicity of the description of the present invention, the data deformatter 606, the RS frame decoder 607, and the mobile service data derandomizer 608 will be collectively referred to as a mobile service data processing unit. And, the data deinterleaver 609, the RS decoder 610, and the main service data derandomizer 611 will be collectively referred to as a main service data processing unit.

More specifically, the tuner 601 tunes a frequency of a particular channel and down-converts the tuned frequency to an intermediate frequency (IF) signal. Then, the tuner 601 outputs the down-converted IF signal to the demodulator 602 and the known sequence detector 604. The demodulator 602 performs self gain control, carrier recovery, and timing recovery processes on the inputted IF signal, thereby modifying the IF signal to a baseband signal. The equalizer 603 compensates the distortion of the channel included in the demodulated signal and then outputs the error-compensated signal to the block decoder 605.

At this point, the known sequence detector 604 detects the known sequence place inserted by the transmitting end from the input/output data of the demodulator 602 (i.e., the data prior to the demodulation process or the data after the demodulation process). Thereafter, the place information (or position indicator) along with the symbol sequence of the known data, which are generated from the detected place, is outputted to the demodulator 602 and the equalizer 603. Also, the known sequence detector 604 outputs a set of information to the block decoder 605. This set of information is used to allow the block decoder 605 of the receiving system to identify the mobile service data that are processed with additional encoding from the transmitting system and the main service data that are not processed with additional encoding.

In addition, although the connection status is not shown in FIG. 9, the information detected from the known sequence detector 604 may be used throughout the entire receiving system and may also be used in the data deformatter 606 and the RS frame decoder 607. The demodulator 602 uses the known data (or sequence) position indicator and the known data symbol sequence during the timing and/or carrier recovery, thereby enhancing the demodulating performance. Similarly, the equalizer 603 uses the known sequence position indicator and the known data symbol sequence so as to enhance the equalizing performance. Moreover, the decoding result of the block decoder 605 may be fed-back to the equalizer 603, thereby enhancing the equalizing performance.

Meanwhile, if the data being inputted to the block decoder 605 after being channel equalized from the equalizer 603 correspond to the mobile service data having additional encoding and trellis encoding performed thereon by the transmitting system, trellis decoding and additional decoding processes are performed on the inputted data as inverse processes of the transmitting system. Alternatively, if the data being inputted to the block decoder 605 correspond to the main service data having only trellis encoding performed thereon, and not the additional encoding, only the trellis decoding process is performed on the inputted data as the inverse process of the transmitting system. The data group decoded by the block decoder 605 is inputted to the data deformatter 606, and the main service data packet is inputted to the data deinterleaver 609.

More specifically, if the inputted data correspond to the main service data, the block decoder 605 performs Viterbi decoding on the inputted data so as to output a hard decision value or to perform a hard-decision on a soft decision value, thereby outputting the result. Meanwhile, if the inputted data correspond to the mobile service data, the block decoder 605 outputs a hard decision value or a soft decision value with respect to the inputted mobile service data. In other words, if the inputted data correspond to the mobile service data, the block decoder 605 performs a decoding process on the data encoded by the block processor and trellis encoding module of the transmitting system.

At this point, the RS frame encoder of the pre-processor included in the transmitting system may be viewed as an external code. And, the block processor and the trellis encoder may be viewed as an internal code. In order to maximize the performance of the external code when decoding such concatenated codes, the decoder of the internal code should output a soft decision value. Therefore, the block decoder 605 may output a hard decision value on the mobile service data. However, when required, it may be more preferable for the block decoder 605 to output a soft decision value.

Meanwhile, the data deinterleaver 609, the RS decoder 610, and the main service data derandomizer 611 are blocks required for receiving the main service data. Therefore, the above-mentioned blocks may not be required in the structure of a digital broadcast receiving system that only receives the mobile service data. The data deinterleaver 609 performs an inverse process of the data interleaver included in the transmitting system. In other words, the data deinterleaver 609 deinterleaves the main service data outputted from the block decoder 605 and outputs the deinterleaved main service data to the RS decoder 610. The RS decoder 610 performs a systematic RS decoding process on the deinterleaved data and outputs the processed data to the main service data derandomizer 611, The main service data derandomizer 611 receives the output of the RS decoder 610 and generates a pseudo random data byte identical to that of the randomizer included in the digital broadcast transmitting system. Thereafter, the main service data derandomizer 611 performs a bitwise exclusive OR (XOR) operation on the generated pseudo random data byte, thereby inserting the MPEG synchronization bytes to the beginning of each packet so as to output the data in 188-byte main service data packet units.

Meanwhile, the data being outputted from the block decoder 605 to the data deformatter 606 are inputted in the form of a data group. At this point, the data deformatter 606 already knows the structure of the data that are to be inputted and is, therefore, capable of identifying the signaling information, which includes the system information, and the mobile service data from the data group. Thereafter, the data deformatter 606 outputs the identified signaling information to a block for system information and outputs the identified mobile service data to the RS frame decoder 607. At this point, the data deformatter 606 removes the known data, trellis initialization data, and MPEG header that were inserted in the main service data and data group. The data deformatter 606 also removes the RS parity that was added by the RS encoder/non-systematic RS encoder or the non-systematic RS encoder of the transmitting system. Thereafter, the processed data are outputted to the RS frame decoder 607. More specifically, the RS frame decoder 607 receives only the RS encoded and CRC encoded mobile service data that are transmitted from the data deformatter 606.

The RS frame encoder 607 performs an inverse process of the RS frame encoder included in the transmitting system so as to correct the error within the RS frame. Then, the RS frame decoder 607 adds the 1-byte MPEG synchronization service data packet, which had been removed during the RS frame encoding process, to the error-corrected mobile service data packet. Thereafter, the processed data packet is outputted to the mobile service data derandomizer 608. The mobile service data derandomizer 608 performs a derandomizing process, which corresponds to the inverse process of the randomizer included in the transmitting system, on the received mobile service data. Thereafter, the derandomized data are outputted, thereby obtaining the mobile service data transmitted from the transmitting system.

As described above, the digital broadcasting system and data processing method according to the present invention have the following advantages. More specifically, the digital broadcasting system and data processing method according to the present invention is robust against for resistant to) any error that may occur when transmitting mobile service data through a channel. And, the present invention is also highly compatible to the conventional system. Moreover, the present invention may also receive the mobile service data without any error even in channels having severe ghost effect and noise.

Additionally, by performing error correction encoding and error detection encoding processes on the mobile service data and transmitting the processed data, the present invention may provide robustness to the mobile service data, thereby enabling the data to effectively respond to the frequent change in channels. Also, when the present invention multiplexes the main service data and the mobile service data in a burst structure, a relative position of a main service data packet is re-adjusted and then multiplexed, thereby mitigating packet jitter, which may occur when the receiving system receives the multiplexed main service data packet. Furthermore, the present invention is even more effective when applied to mobile and portable receivers, which are also liable to a frequent change in channel and which require protection (or resistance) against intense noise.

Moreover, when the main service data and the mobile service data are multiplexed by the service multiplexer within the transmitting system, and when the multiplexed data are transmitted to the transmitter, the present invention generates service informative null packets including the mobile service-related information, which are then multiplexed with the service data packets. Thus, the present invention may match (or put in accord) the data rate of the final output data of the service multiplexer to a constant data rate. The present invention may also enable the transmitter to process the mobile service data more easily. Furthermore, the present invention is even more effective when applied to mobile and portable receivers, which are also liable to a frequent change in channel and which require protection (or resistance) against intense noise.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A digital broadcast receiver comprising:
a tuner configured to receive a digital broadcast signal including mobile service data and known data sequences, wherein the digital broadcast signal is generated in a digital broadcast transmitter by:
randomizing original mobile service data,
encoding the randomized original mobile service data at a code rate of 1/N, wherein N is an integer greater than 1,
mapping the encoded original mobile service data into a data group and adding non-systematic Reed-Solomon (RS) parity data place holders and MPEG header data place holders to the data group, wherein the data group includes known data sequences and signaling information, and wherein the signaling information includes code mode information indicating the code rate of 1/N,
deinterleaving the data group,
removing the non-systematic RS parity data place holders and replacing the MPEG header data place holders with MPEG header data in the deinterleaved data group, thereby outputting mobile service data packets,
inserting non-systematic RS parity data into the mobile service data packets by performing non-systematic RS encoding on the mobile service data packets,
performing convolutional byte interleaving on the non-systematic RS-encoded mobile service data packets, and
trellis encoding, by a trellis encoder, data in the interleaved data packets, wherein at least one memory included in the trellis encoder is initialized at a start of at least one of the known data sequences;
a demodulator configured to demodulate the digital broadcast signal; and
a decoder configured to decode mobile service data in the demodulated digital broadcast signal.

2. The digital broadcast receiver of claim 1, further comprising:
a known data detector configured to detect the known data sequences included in the digital broadcast signal; and
an equalizer configured to compensate a channel distortion of the digital broadcast signal using at least one of the detected known data sequences.

3. The digital broadcast receiver of claim 1, wherein N is 2 or 4.

4. The digital broadcast receiver of claim 1, further comprising a derandomizer configured to derandomize the decoded mobile service data.

5. A method of processing broadcast data in a digital broadcast receiver, the method comprising:
receiving, by a tuner, a digital broadcast signal including mobile service data and known data sequences, wherein the digital broadcast signal is generated in a digital broadcast transmitter by:
randomizing original mobile service data,
encoding the randomized original mobile service data at a code rate of 1/N, wherein N is an integer greater than 1,
mapping the encoded original mobile service data into a data group and adding non-systematic Reed-Solomon (RS) parity data place holders and MPEG header data place holders to the data group, wherein the data group includes known data sequences and signaling information, and wherein the signaling information includes code mode information indicating the code rate of 1/N,
deinterleaving the data group,
removing the non-systematic RS parity data place holders and replacing the MPEG header data place holders with MPEG header data in the deinterleaved data group, thereby outputting mobile service data packets,
inserting non-systematic RS parity data into the mobile service data packets by performing non-systematic RS encoding on the mobile service data packets,
performing convolutional byte interleaving on the non-systematic RS-encoded mobile service data packets, and
trellis encoding, by a trellis encoder, data in the interleaved data packets, wherein at least one memory included in the trellis encoder is initialized at a start of at least one of the known data sequences;

demodulating, by a demodulator, the digital broadcast signal; and decoding, by a decoder, mobile service data in the demodulated digital broadcast signal.

6. The method of claim 5, further comprising:

detecting the known data sequences included in the digital broadcast signal; and compensating a channel distortion of the digital broadcast signal using at least one of the detected known data sequences.

7. The method of claim 5, wherein N is 2 or 4.

8. The method of claim 5, further comprising derandomizing the decoded mobile service data.

* * * * *